(12) United States Patent
Vetterli et al.

(10) Patent No.: US 11,717,107 B2
(45) Date of Patent: Aug. 8, 2023

(54) MACHINE FOR PREPARING HOT BEVERAGES

(71) Applicant: Franke Kaffeemaschinen AG, Aarburg (CH)

(72) Inventors: Heinz Vetterli, Wangen (CH); Simon Muller, Muhen (CH)

(73) Assignee: Franke Kaffeemaschinen AG, Aarburg (CH)

(*) Notice: Subject to any disclaimer, the term of this patent is extended or adjusted under 35 U.S.C. 154(b) by 253 days.

(21) Appl. No.: 16/639,328

(22) PCT Filed: Jul. 20, 2018

(86) PCT No.: PCT/EP2018/069774
§ 371 (c)(1),
(2) Date: Feb. 14, 2020

(87) PCT Pub. No.: WO2019/034374
PCT Pub. Date: Feb. 21, 2019

(65) Prior Publication Data
US 2021/0030197 A1    Feb. 4, 2021

(30) Foreign Application Priority Data

Aug. 15, 2017 (DE) .......................... 102017118598.4

(51) Int. Cl.
*A47J 31/60* (2006.01)
*A47J 31/54* (2006.01)
(Continued)

(52) U.S. Cl.
CPC ............. *A47J 31/60* (2013.01); *A47J 31/542* (2013.01); *B67D 1/07* (2013.01); *B67D 1/0888* (2013.01); *B67D 1/0895* (2013.01)

(58) Field of Classification Search
CPC ...... B67D 1/07; B67D 1/0888; B67D 1/0895; B67D 2210/0012; B08B 9/0321;
(Continued)

(56) References Cited

U.S. PATENT DOCUMENTS 5,325,764 A    7/1994  Nakamura et al.
6,240,952 B1 *  6/2001  Schroeder ................ B67D 1/07
                                         134/169 R (Continued)

FOREIGN PATENT DOCUMENTS

CH          709738       12/2015
CN          101980641     2/2011
(Continued)

*Primary Examiner* — Charles P. Cheyney
(74) *Attorney, Agent, or Firm* — Volpe Koenig

(57) ABSTRACT

A machine for preparing hot beverages, including a beverage outlet for dispensing a prepared hot beverage, an instantaneous water heater for heating water during preparation of the hot beverage, a flow meter for determining the volume flow of water flowing through the instantaneous water heater, and a drainage valve arranged downstream of the instantaneous water heater in the direction of flow formed as a controlled directional control valve via which water flowing through the instantaneous water heater can be conducted to a waste water line or collection container instead towards the beverage outlet. A control device is provided having a scale detection function for analyzing a scaling level of the instantaneous water heater using measured values of the flow meter. This control device, during scaling level analysis, switches the drainage valve to a switched position in which the fluid flow is conducted from the instantaneous water heater directly to the waste water line or collection container.

16 Claims, 2 Drawing Sheets

(51) Int. Cl.
  *B67D 1/07* (2006.01)
  *B67D 1/08* (2006.01)
(58) Field of Classification Search
  CPC ....... B08B 9/0325; A47J 31/60; A47J 31/542; A47J 31/46; A47J 31/469; A47J 31/401
  USPC ................ 99/280, 285; 222/148; 134/18
  See application file for complete search history.

(56) References Cited

U.S. PATENT DOCUMENTS

| | | | |
|---|---|---|---|
| 6,510,782 B1* | 1/2003 | Blaschke | A47J 31/58 99/280 |
| 9,214,017 B2 | 12/2015 | Turi et al. | |
| 2003/0167928 A1 | 9/2003 | Mulle et al. | |
| 2004/0118291 A1* | 6/2004 | Carhuff | A61L 2/04 99/275 |
| 2009/0151573 A1* | 6/2009 | Tonelli | A47J 31/469 99/302 R |
| 2009/0293733 A1* | 12/2009 | Martin | A47J 31/60 99/280 |
| 2011/0192423 A1* | 8/2011 | Boussemart | A47J 31/60 134/18 |
| 2013/0140328 A1* | 6/2013 | Gates | B08B 9/02 134/22.18 |
| 2014/0345652 A1 | 11/2014 | Meng | |
| 2015/0182064 A1* | 7/2015 | Hofer | F24H 1/162 392/481 |
| 2015/0245736 A1* | 9/2015 | Reyhanloo | A47J 31/605 99/280 |
| 2016/0249767 A1* | 9/2016 | Santini | B08B 9/0321 99/290 |
| 2019/0045970 A1* | 2/2019 | Spijker | F16K 11/161 |
| 2019/0368776 A1* | 12/2019 | Hohimer | A47J 31/5253 |
| 2020/0170445 A1* | 6/2020 | Dessing | B67D 1/07 |

FOREIGN PATENT DOCUMENTS

| | | |
|---|---|---|
| CN | 103960972 | 8/2014 |
| CN | 104643934 | 5/2015 |
| CN | 204862720 | 12/2015 |
| CN | 105615666 | 6/2016 |
| CN | 205671939 | 11/2016 |
| CN | 106440328 | 2/2017 |
| DE | 102006042902 | 3/2008 |
| DE | 102008005151 | 7/2009 |
| DE | 102010012788 | 9/2011 |
| DE | 202010010509 | 11/2011 |
| DE | 102012104843 | 12/2013 |
| DE | 102014103811 | 9/2015 |
| EP | 2080461 | 7/2009 |
| EP | 2423619 | 2/2012 |
| EP | 2561778 | 2/2013 |
| EP | 2705784 | 3/2014 |
| JP | 20060317069 | 11/2006 |
| JP | 2007093207 | 4/2007 |
| JP | 2011015953 | 1/2011 |
| JP | 2013085968 | 5/2013 |
| JP | 6096354 | 3/2017 |
| WO | 2013023963 | 2/2013 |
| WO | 2013189869 | 12/2013 |
| WO | 2015007747 | 1/2015 |

* cited by examiner

MACHINE FOR PREPARING HOT BEVERAGES

TECHNICAL FIELD

The present invention relates to a machine for preparing hot beverages, such as for example tea or coffee beverages, comprising a beverage outlet for dispensing a prepared hot beverage, comprising an instantaneous water heater for heating water during the preparation of the hot beverage, comprising a flow meter for analyzing the volume flow of water flowing through the instantaneous water heater, and comprising a drainage valve which is arranged downstream of the instantaneous water heater in the direction of flow and is in the form of a controllable directional control valve via which water flowing through the instantaneous water heater can be conducted into a waste water line or a waste water collection container instead of toward the beverage outlet.

BACKGROUND

Fully automatic coffee machines which prepare freshly brewed coffee beverages in portions at the touch of a button are known in the prior art. The hot water required therefor is generally stored in a hot water boiler so that a lengthy heating up time is eliminated. Occasionally, fully automatic coffee machines have also been proposed in which water is heated by an instantaneous water heater at the time of dispensing the beverage.

It is also known that in fully automatic coffee machines a descaling of the hot water generator has to be carried out from time to time. To this end, for example, solutions are known, as disclosed in WO 2013/023963 A1 or EP 2705784 A1, in which a cartridge comprising a water soluble descaler is inserted and/or attached to the machine in order to carry out a descaling process. In CH 709738 a descaler application device which comprises a descaler solution received in a container having a variable volume is attached to the coffee machine.

SUMMARY

The object of the present invention is to specify a machine for preparing hot beverages, by which hot beverages may be prepared rapidly and reliably, which is low in maintenance and not susceptible to remedial repair and which may be operated in a simple and operationally safe manner by a user and/or operating personnel. In this connection hot beverages may be freshly brewed coffee or tea, and instant beverages, such as for example consomme, instant tees, instant coffee, instant chocolate beverages or the like.

The present invention, therefore, uses a lightweight and compact instantaneous water heater for preparing hot water, in contrast to existing fully automatic coffee machines comprising a boiler. A corresponding instantaneous water heater which may be used within the scope of the present invention is specified, for example, in WO 2013/189869 A1 and in order to avoid unnecessary repetitions, full reference is made thereto.

The invention is based on the recognition, however, that in the case of an instantaneous water heater which is suitable within the scope of the present invention, said instantaneous water heater is susceptible to scaling due to the high temperatures required for the rapid heating of the water and the narrow but long flow paths in the instantaneous water heater. Within the scope of the present invention, therefore, a control device is provided, said control device having a scaling detection function for analyzing a scaling level of the instantaneous water heater using measured values of the flow meter. This control device is designed such that during a scaling level analysis it switches the drainage valve to a switched position in which the fluid flow from the instantaneous water heater is conducted directly into the waste water line or the waste water collection container. The scaling level is thus analyzed only when the drainage valve is open.

The flow rate which may be measured via the flow meter depends, on the one hand, on the pressure difference between the inlet and outlet of the instantaneous water heater and, on the other hand, on the line cross section and thus the scaling level. Thus the scaling level may be analyzed when the input pressure is known, for example the line pressure which is adjustable via a pressure limiter, a known preliminary pump pressure when using a water pump, or a pressure measured by the pressure meter. In this case the open drainage valve ensures that during the measurement only the pressure loss on the instantaneous water heater is taken into account rather than the pressure loss on the subassemblies arranged further downstream, such as for example a brewing chamber or a mixing chamber.

By detecting the scaling level, a message may be generated in good time that a descaling process is required and should be started and/or carried out at some point. Thus the instantaneous water heater is prevented from being able to become clogged, since once the instantaneous water heater is completely clogged it may no longer be descaled and has to be replaced or destroyed.

Expediently, in a heating up phase of the instantaneous water heater the drainage valve serves to conduct the fluid flow coming from the instantaneous water heater into the waste water line or the waste water container, so that only after the heating up process is sufficient hot water conducted in the direction of the beverage outlet, but during the heating up process the water which is not yet sufficiently hot passes into the outlet. In this case, the controller may be configured such that the analysis of the scaling level is carried out during the heating up phase. Thus the analysis of the scaling level is carried out automatically during normal operation and thus requires no interruption to the operation or separate maintenance processes.

In this case, the heating up phase is preferably carried out with each dispensing of a hot beverage. Therefore, after each dispensing of a beverage the instantaneous water heater is switched off and may cool down. This reduces the scaling of the instantaneous water heater. The heating up takes place sufficiently rapidly that it does not constitute a drawback during operation. The analysis of the scaling level may naturally also be carried out with each individual dispensing of a beverage. However, it may also be sufficient only to carry out a measurement of the scaling level with every tenth hot beverage, for example.

In the same manner, in a cooling down phase of the instantaneous water heater the drainage valve may also serve to conduct the fluid flow coming from the instantaneous water heater into the waste water line or the waste water collection container. Thus after the dispensing of a product the instantaneous water heater may be cooled down with water in order to reduce scaling by hot water remaining in the instantaneous water heater. In this case it is also expedient to carry out the cooling down phase with each dispensing of a product. Since the drainage valve is opened during the cooling down phase, therefore, an analysis of the scaling level may be carried out in the cooling down phase as an alternative (or in addition) to the heating up phase.

Naturally, it is not necessary to switch off the instantaneous water heater after each individual dispensing of a beverage. If a plurality of beverages have already been preselected for dispensing, it may also be expedient to switch off the instantaneous water heater only after dispensing the last beverage.

For analyzing the water pressure at the inlet of the instantaneous water heater it is expedient to arrange a pressure meter on the inlet side of the instantaneous water heater. Thus the inlet pressure may be reliably analyzed and the detection of the scaling level is improved.

In a development of the invention, the instantaneous water heater has a helical flow channel with an inlet and an outlet for a fluid flowing through and to be heated up. In this case it is advantageous to configure the flow channel such that the channel cross section thereof is widened at least in an end region in the direction of the outlet. This recognizes that the flow channel of the instantaneous water heater is subjected to scaling to the greatest extent toward its end, since the highest water temperatures are reached there.

Tests have shown that with a uniform channel diameter, the state in which the flow channel is still open, even though scaling is detected by a reduction in the flow rate, and the state in which the flow channel is fully blocked, may occur in very quick succession. In other words, only a very short time period remains in order to react and to initiate a descaling process. Once the instantaneous water heater is clogged it is no longer possible to dissolve the scaling by a descaler and to clear the instantaneous water heater again. In the channel cross section which is proposed here and which widens in the direction of the outlet, however, the reduction in the flow rate and thus the clogging of the flow channel take place substantially more slowly than in the case of a uniform channel cross section. Thus more time remains to carry out the descaling, for example after the close of business of a restaurant or retail store, so that the operating safety is improved as a whole.

The use of a flow channel widening in cross section in an instantaneous water heater for generating hot water for preparing a beverage is, in principle, independent of a detection of the scaling level in the instantaneous water heater and, therefore, may also be used without an automatic detection function as described above. Thus an automatic hot beverage machine comprising such an instantaneous water heater, the channel cross section thereof widening at least in an end region in the direction of the outlet, represents a separate inventive feature which is independently claimed.

The machine for preparing hot beverages may preferably be a fully automatic beverage machine which, after selecting a beverage, fully automatically prepares the correspondingly selected hot beverage and dispenses it into a drinking vessel provided. In particular in a fully automatic beverage machine, it is expedient if a descaling system is provided for automatically descaling the instantaneous water heater. In this manner, a descaling of the instantaneous water heater may be carried out as soon as this is required, at any time and without excessive effort. Generally this is carried out at the start or at the end of an operation by the user, simply at the touch of a button. The beverage preparation machine, without further operating steps such as the insertion of a descaling cartridge or the like being required, then carries out the required steps for descaling the instantaneous water heater.

In a preferred embodiment, the descaling system comprises a mixing container for mixing a descaler solution, a receiving chamber for a storage container for liquid descaler concentrate and a metering pump for the metered conveyance of descaler concentrate from the storage container into the mixing container. In the mixing container, therefore, if required, i.e. when a descaling process is to be carried out, the descaler solution is mixed from the liquid descaler concentrate, which is conveyed from the beverage preparation machine automatically via the metering pump from the storage container into the mixing container, and water.

The use of a liquid descaler concentrate has the advantage that a quantity of concentrate may be stored in the beverage preparation machine for a plurality of descaling processes, so that replacing or refilling the storage container is only required over longer time intervals, even in the case of frequent descaling processes. This significantly reduces the required maintenance effort and permits the user to carry out the descaling regularly without technical knowledge. Additionally, a liquid descaler concentrate may be metered in a simple and operationally safe manner via a metering pump so that the descaler solution may be mixed automatically and always in the correct and desired metered amount.

Expediently, the beverage preparation machine comprises a water pump which extracts water from a drinking water supply line, for example a water connection or a water container inserted in the fully automatic beverage machine, and conveys the water to the instantaneous water heater. The water pump ensures a uniform and sufficiently high pressure which, in particular, is required for preparing espresso coffee in order to obtain an attractive and stable crema.

In this case, the flow meter used in the device is provided, amongst other things, for analyzing the volume of water conveyed by the water pump. Such a flow meter for analyzing the volume also provides several advantages within the scope of the present invention: on the one hand, a fresh water volume, which is filled into the mixing container via the water pump in order to mix the descaler solution, may be measured via the flow meter. On the other hand, as already mentioned, a flow rate, i.e. the volume per time unit, which flows through the instantaneous water heater may be analyzed by the flow meter and the scaling level of the instantaneous water heater may be determined therefrom. Finally, the flow meter naturally also serves to measure the fresh water portions when preparing different hot beverages.

According to an embodiment of the invention, therefore, it is provided that on the suction side the water pump is switchably connectable via a first directional control valve to the mixing container in which the descaler solution is received and/or mixed. Thus the descaler solution may be conveyed from the mixing container via the water pump to the instantaneous water heater in the switched valve position of the first directional control valve.

According to a further embodiment, it is provided that on the pressure side the water pump is switchably connectable via a second directional control valve to a water supply line of the mixing container. For mixing a descaler solution in the mixing container, therefore, water may be conveyed by the water pump to the mixing container in the switched valve position of the second directional control valve.

The drainage valve provided within the scope of the present invention is preferably moved into a switched position within the course of an automatic descaling process, in which after flowing through the instantaneous water heater the descaler solution is not conducted in the direction of the beverage outlet, for example to a brewing device, but passes directly into a waste water line or a corresponding waste water collection container. By the descaler solution not being dispensed to the normal beverage outlet, an inadvertent operating error is avoided, which could lead to a dispensing of descaler solution into a beverage container of a customer, for example.

A programmable control device is expedient and advantageous for carrying out fully automatic descaling processes within the scope of the present invention, for carrying out an automatic descaling process said control device being configured and/or programmed to activate the metering pump in order to convey a predetermined quantity of descaler concentrate from the storage container into the mixing container; said control device being further programmed to switch the second directional control valve in order to connect the water pump to the water supply line of the mixing container and to activate the water pump in order to convey a predeterminable quantity of water into the mixing container; and said control device being further programmed to switch the first directional control valve in order to connect the water pump on the suction side to the extraction line of the mixing container and to convey the descaler solution from the mixing container to the instantaneous water heater.

Within the scope of the present invention, a method is also provided for analyzing a scaling level in a machine for preparing hot beverages, comprising an instantaneous water heater for heating water for the preparation of a hot beverage. In the method, a flow rate of water flowing through the instantaneous water heater is measured by a flow meter and the scaling level is analyzed using the flow rate. In this case, according to the invention it is provided that during the analysis of the scaling level, a drainage valve, which is arranged in the flow direction downstream of the instantaneous water heater, is moved into a switched position in which water flowing through the instantaneous water heater (10, 20) is conducted directly into a waste water line or a collection container instead of in the direction of a beverage outlet of the machine.

BRIEF DESCRIPTION OF THE DRAWINGS

Further advantages and features of the present invention are disclosed in the following description of an exemplary embodiment with reference to the figures. In the figures.

DETAILED DESCRIPTION

Figure 1:
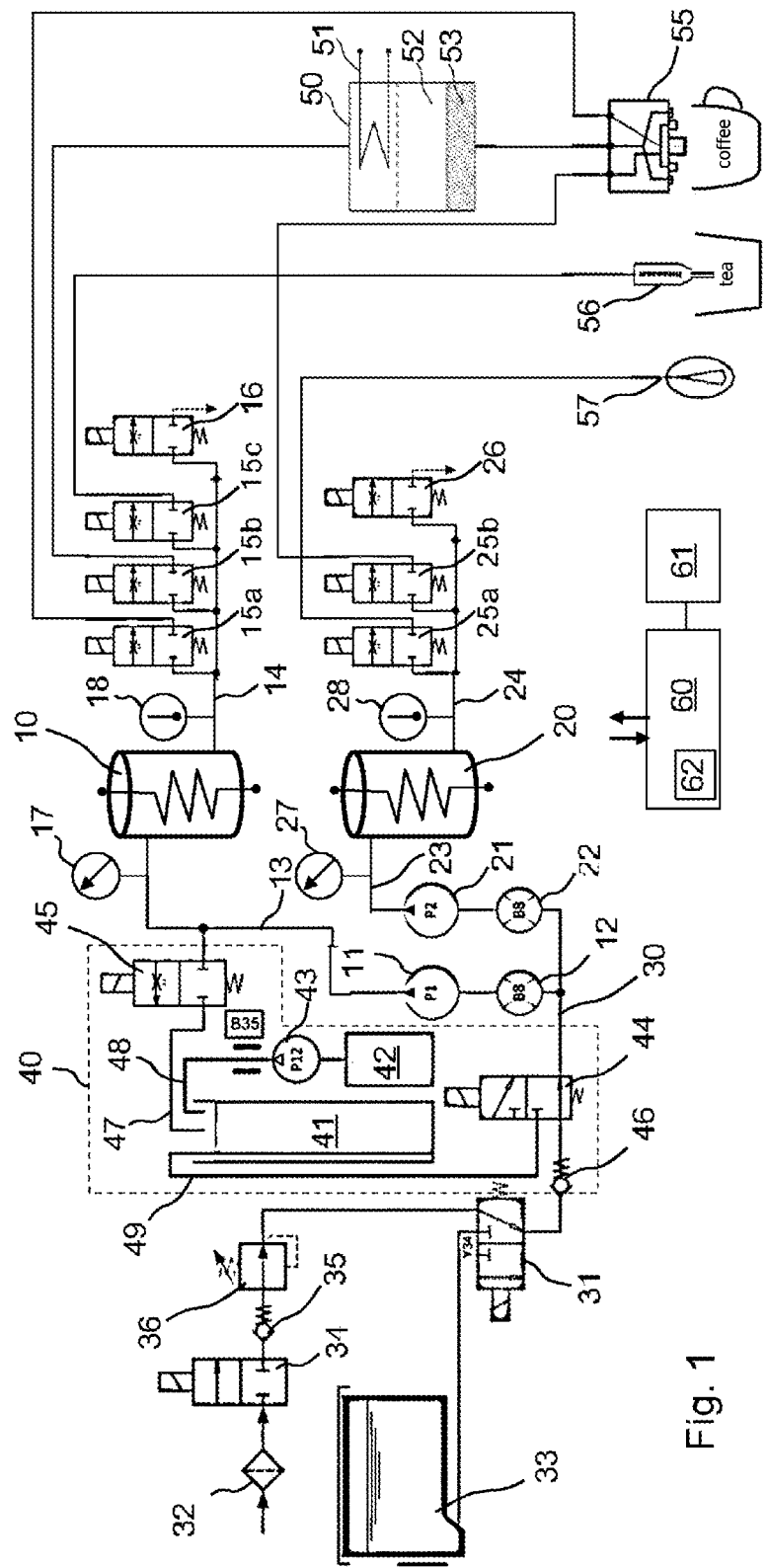
FIG. 1 shows a water flow diagram of a fully automatic beverage machine comprising two instantaneous water heaters and an integrated descaling system for automatically descaling the instantaneous water heater.

In FIG. 1 the construction of a machine for preparing hot beverages, as is used for example in a fully automatic coffee machine, is shown in a so-called water flow diagram. An instantaneous water heater 10 serves for producing hot water, hot beverages being prepared thereby. In the water flow direction upstream of the instantaneous water heater 10 are located a water pump 11 and a flow meter 12 which are connected via a line 13 to the instantaneous water heater 10. A plurality of directional control valves 15a, 15b, 15c and 16 are connected to the hot water outlet of the instantaneous water heater 10 via a line 14. Optionally, a pressure meter 17 may be arranged at the inlet of the instantaneous water heater 10 and a temperature probe 18 may be arranged at the outlet of the instantaneous water heater 10.

In addition to the instantaneous water heater 10 provided for the preparation of hot water, the machine has a second instantaneous water heater 20 which serves for producing steam, which may also serve for preparing hot beverages, for example for reheating or foaming milk or other beverages. Moreover, the second instantaneous water heater 20, which serves here for producing steam, is also understood within the meaning of the present invention as a hot water generator in the broader sense.

Upstream of the second instantaneous water heater 20 are also located a water pump 21 and a flow meter 22 which are connected via a line 23 to the inlet of the instantaneous water heater 20. Different directional control valves 25a, 25b, 26 are connected to the hot water and/or steam outlet of the instantaneous water heater 20 via a line 24. Optionally also a pressure meter 17 may also be arranged at the inlet of the instantaneous water heater 20 and a temperature probe 28 may be arranged at the outlet of the instantaneous water heater 20.

In the exemplary embodiment the two flow meters 12, 22 are arranged in each case upstream of the assigned pumps 11, 21. However, it might similarly be possible to arrange the flow meters 12, 22 in the flow direction downstream of the assigned water pumps 11, 21. On the suction side, the two water pumps 11, 21 are connected via a drinking water supply line 30 and an optional changeover valve 31 to a drinking water connection 32 of the public water mains or a water tank 33 provided on or in the appliance. In the case of a connection to the public water mains 32, a check valve 34, a non-return valve 35 and a pressure reducer 36 may be provided in the supply line.

The water pump 11 conveys drinking water from the connected drinking water supply line 30 via the line 13 to the instantaneous water heater 10 from where the hot water may be conveyed via the directional control valve 15b to a brewing unit 50. The brewing unit 50 comprises in a manner known per se a heater 51, by which the supplied hot water may be brought to boil or the brewing unit may be preheated, and a brewing chamber 52 into which portions of freshly ground coffee grounds 53 are filled. A brewing unit which may be used within the scope of the present invention is described in EP 2561778 A1, for example, full reference being made thereto in order to avoid unnecessary repetitions.

The brewing unit 50 is designed such that it may be opened in order to fill a portion of a quantity of coffee grounds which previously has been freshly ground in portions in a mill of the fully automatic coffee machine. Moreover, when the brewing unit is opened after the brewing process the remaining coffee dregs may be ejected into a residue container. The brewing unit also has a movable piston (not shown) which compresses the filled-in coffee grounds against a brewing sieve located in the brewing chamber. After the piston moves back, under the pressure of the pump 11 the brewing water from the instantaneous water heater 10 may flow through the coffee grounds thus compressed. The finished brewed coffee is conducted from the brewing unit 50 via an outlet line to an outlet 55 for coffee beverages. Via the directional control valve 15a hot water may be conducted directly to the outlet 55, for example for cleaning purposes or for preparing instant beverages. Moreover, hot water may also be conducted via the directional control valve 15c to a separate hot water outlet 56 which, for example, serves for preparing tea.

Steam produced by the second instantaneous water heater 20 may be conducted via the directional control valve 25a either to a so-called steam lance 57 in order to foam, for example, milk, and steam may also be conducted via the directional control valve 25b to the outlet 55 in order to heat or foam, for example, milk supplied via a separate line (not shown).

Drainage valves 16 and 26 which are configured as directional control valves serve to connect the hot water outlet of the instantaneous water heater 10 and/or the instantaneous water heater 20 to a so-called drainage system, i.e. a waste water line or a waste water collection container for waste water. This is required, amongst other things, for the purpose of descaling the assigned instantaneous water heater 10, 20 in order to divert the descaler solution conducted through the instantaneous water heater 10, 20.

In addition, however, the two drainage valves 16, 26 also serve to conduct the through-flowing water in a heating up phase of the assigned instantaneous water heater into the waste water line or the waste water collection container. Thus it is ensured that heated water and/or steam is conducted in the direction of the assigned outlet only after reaching a predeterminable minimum temperature. However, during the heating up process water which is not sufficiently hot is diverted into the waste water system, i.e. may not pass to one of the outlets 55, 56, 57.

Figure 2:
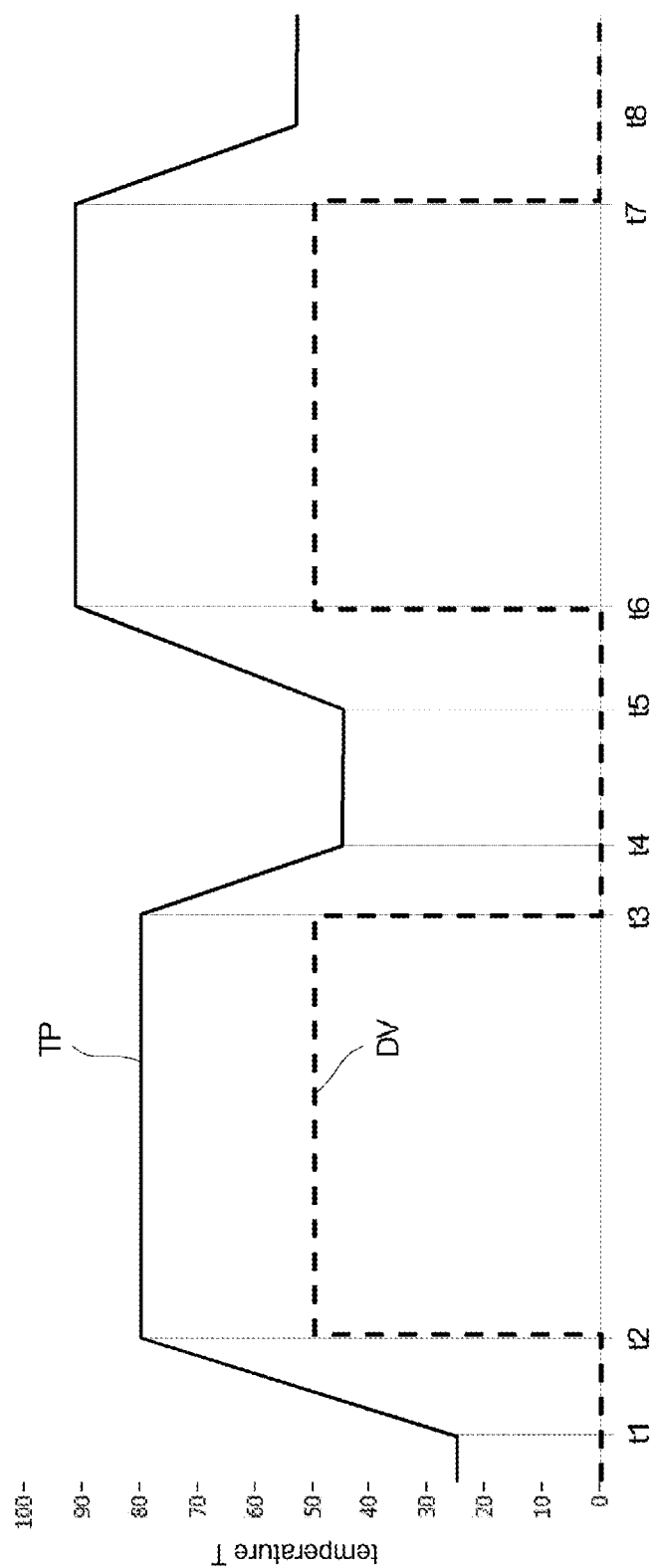
FIG. 2 shows in a diagram the curve of the water temperature at the outlet of the instantaneous water heater over time and the switching states of the drainage valve.

In FIG. 2 the temperature curve and the switching state of the drainage valve 16 is shown. The drainage valve 16 in this case is configured as a solenoid valve which is opened in the absence of current. The temperature curve measured by the temperature probe 18 at the outlet of the instantaneous water heater 10 is denoted by TP, the solenoid current for the drainage valve 16 is denoted by DV. The curves are shown in an idealized manner. In reality, the temperature curve may be accordingly subjected to slight fluctuations corresponding to the temperature regulation.

At the start of the dispensing of a product the water pump 11 is switched on and pumps water out of the supply line 30 in the direction of the instantaneous water heater 10. Since no current is applied to the drainage valve 16, i.e. it is open, the water coming from the instantaneous water heater 10 flows via the line 14 into the outflow. The valves 15a, 15b and 15c in this case are closed. The water temperature TP at the outlet of the instantaneous water heater corresponds to the feed temperature, in the present case approximately 24° C.

At a time t1 the heating unit of the instantaneous water heater 10 is switched on. The temperature TP now rises to a set reference temperature. This is 80° C. for the first dispensing of a product. At the time t2 the set temperature is not reached. Now the drainage valve 16 is closed (solenoid current applied) and the valve 15b opened so that the water which is now sufficiently hot is no longer conducted to the outflow but to the brewing chamber 50. The preparation of a coffee beverage which is dispensed at the outlet 50 starts. The water temperature TP is kept constant in terms of control accuracy by regulating the heating power of the instantaneous water heater 10. The temperature curve in FIG. 2 is shown in an idealized manner as mentioned above and naturally may fluctuate in terms of control accuracy.

At a time t3 the preparation of the coffee beverage is completed. The valve 15b is closed and the drainage valve 16 is opened. At the same time, the heating unit of the instantaneous water heater 10 is switched off. Since the pump 11 continues to convey water, when the heating unit is switched off the water temperature reduces slowly at the outlet of the instantaneous water heater 10 since said instantaneous water heater cools down. At a time t4 the water pump 11 is switched off, no more water flows, the temperature of the residual water remaining in the line stays approximately constant and/or only falls slowly.

A second dispensing of a product starts at the time t5 by switching on the water pump 11 and the heating unit of the instantaneous water heater 10. The drainage valve 16 is still open so that water is diverted again out of the instantaneous water heater 10 into the outflow. The water temperature TP rises further since the heating unit heats up the instantaneous water heater. The target temperature with the second dispensing of a product is now 92° C. When the target temperature is reached at the time t6 the drainage valve 16 is closed and the valve 15b to the brewing chamber 50 is opened. After the end of the dispensing of a product at the time t7 the valve 15b is closed again and the drainage valve 16 is opened. Moreover, the heating unit of the instantaneous water heater 10 is switched off. The water which has now cooled down again is conducted into the outflow until at the time t8 the water pump 11 is switched off. The instantaneous water heater is now cooled down by the water flowing through, in order to reduce scaling.

It is essential that during the time periods t1-t2 and t5-t6, i.e. during the heating up, and during the time periods t3-t4 and t7-t8, i.e. during the cooling down, the drainage valve is open and thus in these phases an analysis of the flow rate through the instantaneous water heater may be carried out. If this flow rate which is measured in this manner reduces significantly over time and falls below a minimum flow rate, it may be extrapolated therefrom that the flow path through the instantaneous water heater 10 is restricted by scaling and thus a descaling process should be carried out. This is manually started in the exemplary embodiment and then carried out automatically.

To this end, an integrated descaling system 40 which is described hereinafter is provided. The descaling system 40 comprises a mixing container 41, a storage container 42 for liquid descaler concentrate and a metering pump 43. The common drinking water supply line 30 on the suction side of the water pumps 11, 21 may be connected via a changeover valve 44 to a suction line 49 which reaches as far as the floor of the mixing container 41 in order to suction a descaler solution from the mixing container 41 for the purpose of descaling and to convey said descaler solution to the instantaneous water heaters 10, 20. The descaler solution has been previously mixed in the mixing container 41 by a meterable quantity of descaler concentrate being conveyed via the metering pump 43 into the mixing container via the supply line 48.

Via a directional control valve 45 which is connected to the supply line 13 which is connected to the pump 11 on the pressure side, fresh water may be filled by the water pump 11 into the mixing container via the supply line 47. The quantity of fresh water filled in may be analyzed in this case by the flow meter 12 so that after a predetermined water quantity has been filled into the mixing container 41 the valve 45 may be closed.

After the descaler solution has been mixed in the mixing container 41, the supply line 30 may be connected to the suction line 49 via the valve 44. Then the drainage valve 16 is opened and via the water pump 11 the descaler solution is conveyed from the mixing container 41 through the instantaneous water heater 10. Then the changeover valve 44 is again switched back to the operating position in which the supply line 30 is connected to the public water connection 32 or the water tank 33 and fresh water is flushed through the instantaneous water heater 10 again by the water pump 11. A non-return valve 46 prevents descaler solution which is potentially still located in the supply line 30 from flowing back into the fresh water tank 33. In the same manner, the instantaneous water heater 20 may also be descaled and cleaned by descaler solution being conveyed via the water pump 21 from the mixing container 41 through the instantaneous water heater 20 and via the drainage valve 26 into the outlet.

Whilst the instantaneous water heater 20 serves for producing steam in the present exemplary embodiment, within the meaning of the present invention it may also be understood as being a hot water generator in the broader sense. It is obvious that the directional control valve 45 of the descaling system 40 may also be connected to the water pump 21 via the line 23, instead of to the water pump 11 via the line 13. The instantaneous water heaters 10, 20 which are used in the present exemplary embodiment are compact instantaneous water heaters in the form of so-called heating cartridges. These heating cartridges have a thin-walled cylindrical inner body which is provided with electrical heating wires, the outer surface thereof being provided on the outer face with a groove running in a helical manner which is defined outwardly by an outer cylindrical jacket and thus forms a flow path for the mains water to be heated. Such a heating cartridge is disclosed, for example, in the publication WO 2013/189869 A1, full reference being made thereto to avoid unnecessary repetitions. In the direction of the end, i.e. in the direction of the outlet of the instantaneous water heater, the cross section of the groove widens. This has the result that an increased amount of scaling is not able to clog up fully the instantaneous water heater in the direction of the end prematurely, i.e. before any detection and removal of scaling, and thus make the instantaneous water heater unuseable.

The fully automatic coffee machine which is described in the exemplary embodiment also has a programmable controller 60 and a user interface 61 which is connected to the controller 60, for example in the form of a touch-sensitive display or another type of display and input unit. The functions of the water pumps 11, 21, all of the directional control valves, the activation of the instantaneous water heaters 10, 20 and the descaling system 40 and the metering pump 43 thereof are activated via the controller 60. The controller also reads the measured values from the flow meters 12, 22. Via the controller 60, in normal operation, both the preparation of coffee beverages or other hot beverages may be controlled and a descaling of the instantaneous water heaters 10, 20 may be carried out by the descaling system 40. The controller 60 may establish via the two flow meters 12, 22 how long it takes until a predeterminable quantity of water flows through the assigned instantaneous water heaters 10 and/or 20. The scaling level of the instantaneous water heaters 10, 20 may be estimated therefrom, so that the controller may generate a message via the graphical user interface 61 that an automatic descaling process might be necessary. A user may then trigger and/or activate the automatic descaling process via a corresponding input on the user interface 61.

For detecting scaling, the controller 60 implements a detection function, for example in the form of a suitable software routine, a program module, a service, or the like, which checks before carrying out a detection whether the drainage valve 16 and/or 26 is open and the water pump 11 and/or 21 is activated, instructs this if required, and then by the flow meter 12 and/or 22 determines a flow rate through the relevant instantaneous water heater 10, 20. In addition to the flow rate, also via the relevant pressure meter 17 and/or 27, the pressure may be determined at the inlet of the instantaneous water heater 10 and/or 20 and, using the measured pressure value, the value for the measured flow rate may be corrected. If this flow rate, optionally a flow rate which has been calibrated to a uniform inlet pressure, has reduced over time below a minimum flow rate, i.e. over a plurality of heating up and cooling down cycles, a message is generated that a descaling process is to be carried out.

For carrying out the descaling process, as already described above, initially a metered quantity of descaler concentrate is conveyed from the storage container 42 into the mixing container 41 and then the mixing container 41 is filled with fresh water via the directional control valve 45. The descaler solution 41 is then conducted through the relevant instantaneous water heater 10 and/or 20 in order to descale said instantaneous water heater. Then fresh water is flushed through. The fully automatic coffee machine is then ready for operation again.

Citric acid, malic acid or tartaric acid in the form of a concentrated solution may be used, for example, as descaler concentrate. The descaler concentrate may either be filled into disposable packaging or refilled as required into a refillable storage container. In this case, the storage container may be fixedly built into the fully automatic beverage machine but is preferably removable for filling or replacement. In the case of a disposable container, this may be opened and/or connected to the metering pump, for example, by being pierced by an extraction lance or a pin.

The invention claimed is:

1. A machine for preparing hot beverages, comprising:
    a beverage outlet (55) configured for dispensing a prepared hot beverage,
    an instantaneous water heater (10, 20) configured for heating water during preparation of the hot beverage,
    a flow meter (12, 22) configured for analyzing a volume flow of water flowing through the instantaneous water heater (10, 20),
    a drainage valve arranged downstream of the instantaneous water heater (10, 20) in a direction of flow, the drainage valve comprising a controlled directional control valve (16, 26) via which water flowing through the instantaneous water heater (10, 20) is conductable to a waste water line or a waste water collection container instead of toward the beverage outlet,
    a controller (60) which has a scaling detection function (61) configured for carrying out an analysis of a scaling level of the instantaneous water heater (10, 20) using measured values of the flow meter (12, 22), the controller (60) is further configured such that during scaling level analysis the controller switches the drainage valve (16, 26) to a switched position in which water coming from the instantaneous water heater (10, 20) is conducted directly to the waste water line or the waste water collection container instead of the beverage outlet, and
    wherein the controller is further configured to detect the scaling level based on at least one of a minimum flow rate detected by the flowmeter or a flow-through time required until a certain water volume measured by the flowmeter has passed the flow heater to the drain outlet exceeding a predetermined threshold value.

2. The machine as claimed in claim 1, wherein in a heating up phase of the instantaneous water heater (10, 20) the controller controls the drainage valve (16, 26) to conduct the water coming from the instantaneous water heater (10, 20) into the waste water line or the waste water collection container and the controller (60) is configured to carry out the analysis of the scaling level during the heating up phase.

3. The machine as claimed in claim 2, wherein the controller is configured to carry out the heating up phase with each dispensing of a hot beverage.

4. A machine for preparing hot beverages, comprising:
a beverage outlet (55) configured for dispensing a prepared hot beverage,
an instantaneous water heater (10, 20) configured for heating water during preparation of the hot beverage,
a flow meter (12, 22) configured for analyzing a volume flow of water flowing through the instantaneous water heater (10, 20),
a drainage valve arranged downstream of the instantaneous water heater (10, 20) in a direction of flow, the drainage valve comprising a controlled directional control valve (16, 26) via which water flowing through the instantaneous water heater (10, 20) is conductable to a waste water line or a waste water collection container instead of toward the beverage outlet,
a controller (60) which has a scaling detection function (61) configured for carrying out an analysis of a scaling level of the instantaneous water heater (10, 20) using measured values of the flow meter (12, 22), the controller (60) is further configured such that during scaling level analysis the controller switches the drainage valve (16, 26) to a switched position in which water coming from the instantaneous water heater (10, 20) is conducted directly to the waste water line or the waste water collection container instead of the beverage outlet, and
wherein in a cooling down phase of the instantaneous water heater (10, 20) the controller controls the drainage valve (16, 26) to conduct the water coming from the instantaneous water heater (10, 20) into the waste water line or the waste water collection container, and the controller (60) is further configured to carry out the analysis of the scaling level during the cooling down phase.

5. The machine as claimed in claim 3, wherein the controller is configured to carry out the cooling down phase with each dispensing of a hot beverage.

6. The machine as claimed in claim 1, further comprising a pressure meter (17, 18) arranged on an inlet side of the instantaneous water heater (10, 20).

7. The machine as claimed in claim 1, wherein the instantaneous water heater (10, 20) has a helical flow channel with an inlet and an outlet for a liquid flowing therethrough and to be heated up, a channel cross section thereof being widened at least in an end region in direction of the outlet.

8. The machine as claimed in claim 1, further comprising a descaling system (40) for automatically descaling the instantaneous water heater (10, 20).

9. The machine as claimed in claim 8, wherein the descaling system (40) comprises a mixing container (41) configured for mixing a descaler solution, a receiving chamber for a storage container (42) for liquid descaler concentrate, and a metering pump (43) configured for metered conveyance of descaler concentrate from the storage container (42) into the mixing container (41), in which the descaler solution is adapted to be mixed from the descaler concentrate and water.

10. The machine as claimed in claim 1, further comprising a water pump (11, 21) which is configured to convey water from a drinking water supply line (30) to the instantaneous water heater (10, 20).

11. A fully automatic beverage machine comprising:
a machine for preparing hot beverages, including:
a beverage outlet (55) configured for dispensing a prepared hot beverage,
an instantaneous water heater (10, 20) configured for heating water during preparation of the hot beverage,
a flow meter (12, 22) configured for analyzing a volume flow of water flowing through the instantaneous water heater (10, 20),
a drainage valve arranged downstream of the instantaneous water heater (10, 20) in a direction of flow, the drainage valve comprising a controlled directional control valve (16, 26) via which water flowing through the instantaneous water heater (10, 20) is conductable to a waste water line or a waste water collection container instead of toward the beverage outlet,
a controller (60) which has a scaling detection function (61) configured for carrying out an analysis of a scaling level of the instantaneous water heater (10, 20) using measured values of the flow meter (12, 22), the controller (60) is further configured such that during scaling level analysis the controller switches the drainage valve (16, 26) to a switched position in which water coming from the instantaneous water heater (10, 20) is conducted directly to the waste water line or the waste water collection container instead of the beverage outlet, and
a descaling system (40) for automatically descaling the instantaneous water heater (10, 20); and
a water pump (11, 21) which is configured to convey water from a drinking water supply line (30) to the instantaneous water heater (10, 20), wherein on a suction side the water pump (11, 21) is switchably connectable via a first directional control valve (44) to an extraction line (49) of a mixing container (41), which serves for receiving a descaler solution, in order to convey the descaler solution from the mixing container (41) to the instantaneous water heater (10, 20) in a switched valve position of the first directional control valve (44).

12. The fully automatic beverage machine as claimed in claim 11, wherein on a pressure side the water pump (11) is switchably connectable via a second directional control valve (45) to a water supply line (47) of a mixing container (41) which serves for mixing a descaler solution from a liquid descaler concentrate in order to convey water to the mixing container (41) in a switched valve position of the second directional control valve (45).

13. The fully automatic beverage machine as claimed in claim 12, wherein for carrying out an automatic descaling process the controller (60) is programmed to activate the metering pump (43) in order to convey a predetermined quantity of descaler concentrate from the storage container (42) into the mixing container (41), said controller being further programmed to switch the second directional control valve (45) in order to connect the water pump (11) to the water supply line (47) of the mixing container (41) and to activate the water pump (11, 21), to convey a predeterminable quantity of water into the mixing container (41), and said controller being further programmed to switch the first directional control valve (44) in order to connect the water pump (11) on the suction side to the mixing container (41) and to convey the descaler solution from the mixing container (41) to the instantaneous water heater (10, 20).

14. The fully automatic beverage machine as claimed in claim 13, wherein, wherein the controller is configured to generate a message that a descaling process is required when a predetermined value has been reached.

15. The fully automatic beverage machine as claimed in claim 14, wherein the predetermined value is a maximum through-flow time or a minimum flow rate.

16. The fully automatic beverage machine as claimed in claim 1, further comprising a brewing or mixing chamber connected between the water heater and the beverage outlet, the drain outlet bypasses the brewing or mixing chamber, and the scaling level analysis takes place upon a water flow that bypasses the brewing or mixing chamber and is directed through the drain outlet.

* * * * *